(12) United States Patent
Kennedy, III

(10) Patent No.: US 9,114,283 B2
(45) Date of Patent: Aug. 25, 2015

(54) GOLF BALL WITH LATTICE REINFORCED LAYER

(75) Inventor: Thomas J. Kennedy, III, Wilbraham, MA (US)

(73) Assignee: NIKE, Inc., Beaverton, OR (US)

( * ) Notice: Subject to any disclaimer, the term of this patent is extended or adjusted under 35 U.S.C. 154(b) by 254 days.

(21) Appl. No.: 13/484,008

(22) Filed: May 30, 2012

(65) Prior Publication Data
US 2013/0324322 A1 Dec. 5, 2013

(51) Int. Cl.
| *A63B 37/00* | (2006.01) |
| *A63B 45/00* | (2006.01) |
| *B29C 45/14* | (2006.01) |
| *B29C 45/16* | (2006.01) |
| *B29L 31/54* | (2006.01) |

(52) U.S. Cl.
CPC .............. *A63B 45/00* (2013.01); *A63B 37/0003* (2013.01); *A63B 37/0097* (2013.01); *B29C 45/14221* (2013.01); *B29C 45/14819* (2013.01); *B29C 45/1675* (2013.01); *A63B 37/0074* (2013.01); *A63B 37/0075* (2013.01); *A63B 37/0076* (2013.01); *B29C 45/14344* (2013.01); *B29L 2031/546* (2013.01)

(58) Field of Classification Search
CPC ....................... A63B 37/0097; B29L 2031/546
USPC .......... 473/367, 368, 370, 371, 374, 376, 377
See application file for complete search history.

(56) References Cited

U.S. PATENT DOCUMENTS

| 5,836,834 | A | * | 11/1998 | Masutani et al. | 473/374 |
| 5,984,807 | A | * | 11/1999 | Wai et al. | 473/376 |
| 6,039,910 | A | * | 3/2000 | Tanaka et al. | 264/248 |
| 6,066,054 | A | * | 5/2000 | Masutani | 473/374 |
| 6,884,182 | B2 | * | 4/2005 | Nardacci | 473/374 |
| 7,881,818 | B2 | | 2/2011 | Van Bael et al. | |
| 2001/0019973 | A1 | * | 9/2001 | Maruko et al. | 473/374 |
| 2002/0016225 | A1 | * | 2/2002 | Maruko et al. | 473/377 |
| 2008/0287218 | A1 | * | 11/2008 | Freund | 473/377 |
| 2009/0062036 | A1 | * | 3/2009 | Hebert et al. | 473/377 |
| 2011/0177884 | A1 | | 7/2011 | Ichikawa et al. | |
| 2013/0165260 | A1 | * | 6/2013 | Molinari | 473/355 |

FOREIGN PATENT DOCUMENTS

JP 2004-180978 * 7/2004 ............ A63B 37/04

* cited by examiner

*Primary Examiner* — John E Simms, Jr.
(74) *Attorney, Agent, or Firm* — Honigman Miller Schwartz and Cohn LLP; Matthew H. Szalach; Jonathan P. O'Brien

(57) ABSTRACT

A golf ball includes a lattice reinforced layer, which is a layer made of at least two materials with different properties. The materials are interlocked with each other, where one material forms a grid with pores while the other material protrudes through the pores. In some embodiments, the lattice reinforced layer is manufactured using a shutoff molding technique so that the entire lattice reinforced layer is molded in the same mold. The lattice layer is provided to alter the properties of a layer, such as increasing the durability, toughness, or strength of the layer.

15 Claims, 11 Drawing Sheets

GOLF BALL WITH LATTICE REINFORCED LAYER

BACKGROUND

The present invention relates generally to a golf ball having a layer made of interlocking materials.

The game of golf is an increasingly popular sport at both amateur and professional levels. A wide range of technologies related to the manufacture and design of golf balls are known in the art. Such technologies have resulted in golf balls with a variety of play characteristics and durability. For example, some golf balls have a better flight performance than other golf balls. Some golf balls with a good flight performance do not have a good feel when hit with a golf club. Some golf balls with good performance and feel lack durability. Thus, it would be advantageous to make a durable golf ball with a good flight performance that also has a good feel.

SUMMARY

A golf ball includes a lattice reinforced layer as any layer of a multi-layer golf ball. In broad terms, the lattice reinforced layer is a layer made of at least two materials with different properties. The materials are interlocked with each other, where one material forms a grid with pores while the other material protrudes through the pores. In some embodiments, the lattice reinforced layer is manufactured using a shutoff molding technique so that the entire lattice reinforced layer is molded in the same mold.

In one aspect the invention provides a golf ball comprising a core, a cover positioned radially outward of the core, and a lattice layer positioned between the core and the cover.

In another aspect, the invention provides a golf ball comprising a lattice reinforced layer having a first surface and a second surface. The lattice reinforced layer comprises a first material and a second material, wherein the first material and the second material are interlocked. The first surface consists of the first material and the second surface consists of the first material and the second material.

In another aspect, the invention provides a method of making a golf ball, the method comprising the steps of providing a mold having a cavity, a mold surface, and telescoping members; positioning the telescoping members in an extended position, so that the telescoping members are in contact with the mold surface; injecting a first material into the cavity; ceasing injecting the first material into the cavity; moving the telescoping members to a retracted position; and injecting a second material into the cavity to produce a lattice portion.

Other systems, methods, features and advantages of the invention will be, or will become, apparent to one of ordinary skill in the art upon examination of the following figures and detailed description. It is intended that all such additional systems, methods, features and advantages be included within this description and this summary, be within the scope of the invention, and be protected by the following claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DETAILED DESCRIPTION

Figure 1:
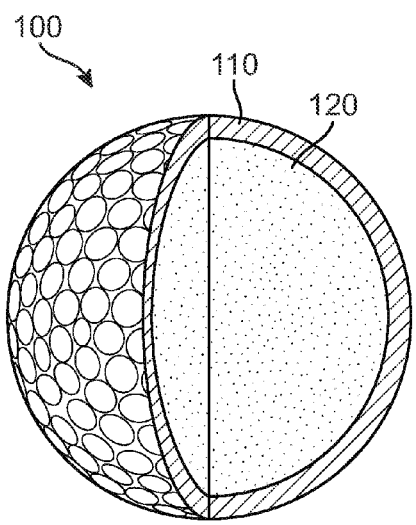
FIG. 1 is a schematic drawing of a two-piece golf ball.

Generally, the present disclosure relates to a golf ball with a lattice reinforced layer. In broad terms, the lattice reinforced layer is a layer made of at least two materials with different properties. The materials are interlocked with each other, where one material forms a grid with pores while the other material protrudes through the pores. In some embodiments, the lattice reinforced layer is manufactured using a shutoff molding technique so that the entire lattice reinforced layer is molded in the same mold.

The golf ball may be made by any suitable process. The process of making the golf ball may be selected based on a variety of factors. For example, the process of making the golf ball may be selected based on the type of materials used and/or the number of layers included. Exemplary processes are discussed below with respect to the individual layers of the exemplary embodiment.

As used herein, the term "about" is intended to allow for engineering and manufacturing tolerances, which may vary depending upon the type of material and manufacturing process, but which are generally understood by those in the art. Also, as used herein, unless otherwise stated, compression, hardness, COR, and flexural modulus are measured as follows:

Compression deformation: The compression deformation herein indicates the deformation amount of the ball under a force; specifically, when the force is increased to become 130 kg from 10 kg, the deformation amount of the ball under the force of 130 kg subtracts the deformation amount of the ball under the force of 10 kg to become the compression deformation value of the ball. All of the tests herein are performed using a compression testing machine available from Automated Design Corp. in Ill., USA. The ADC compression tester can be set to apply a first load and obtain a first deformation amount, and then, after a selected period, apply a second, typically higher load and determine a second deformation amount. Thus, the first load herein is 10 kg, the second load herein is 130 kg, and the compression deformation is the difference between the second deformation and the first deformation. Herein, this distance is reported in millimeters. The compression can be reported as a distance, or as an equivalent to other deformation measurement techniques, such as Atti compression.

Hardness: Hardness of golf ball layer is measured generally in accordance with ASTM D-2240, but measured on the land area of a curved surface of a molded ball. Other types of hardness, such as Shore C or JIS-C hardnesses may be provided as specified herein. For material hardness, it is measured in accordance with ASTM D-2240 (on a plaque).

Method of measuring COR: A golf ball for test is fired by an air cannon at an initial velocity of 131 ft/s, and a speed monitoring device is located over a distance of 0.6 to 0.9 meters from the cannon. When striking a steel plate positioned about 1.2 meters away from the air cannon, the golf ball rebounds through the speed-monitoring device. The return velocity divided by the initial velocity is the COR. A COR measuring system is available from ADC.

The construction of a golf ball made according to the present method is not limited to the embodiments mentioned with specificity herein. For example, a golf ball in accordance with this disclosure may generally take any construction, such as a conforming or non-conforming construction. Conforming golf balls are golf balls which meet the Rules of Golf as approved by the United States Golf Association (USGA).

Figure 2:
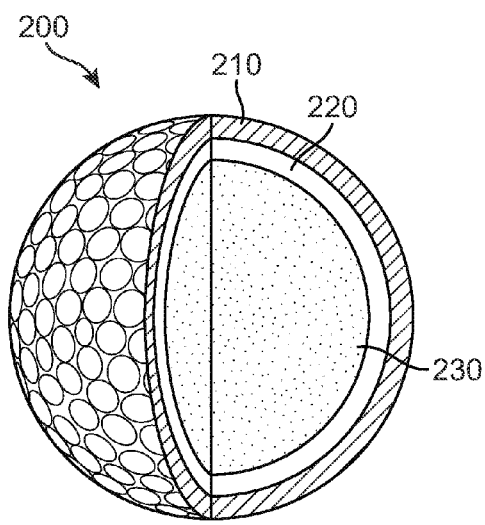
FIG. 2 is a schematic drawing of a three-piece golf ball, the golf ball having a core, a mantle, and a cover.
Figure 3:
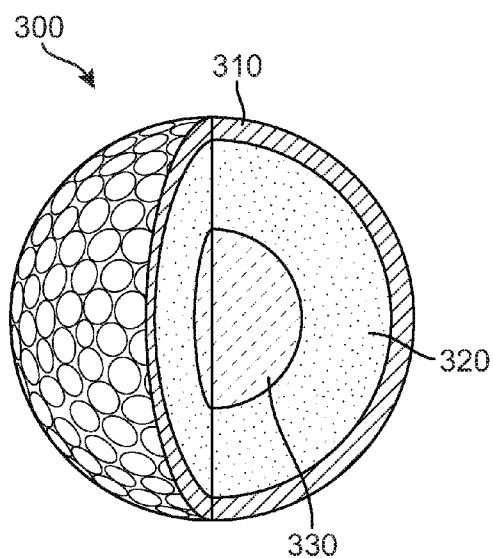
FIG. 3 is a schematic drawing of a three-piece golf ball, the golf ball having an inner core, an outer core, and a cover.
Figure 4:
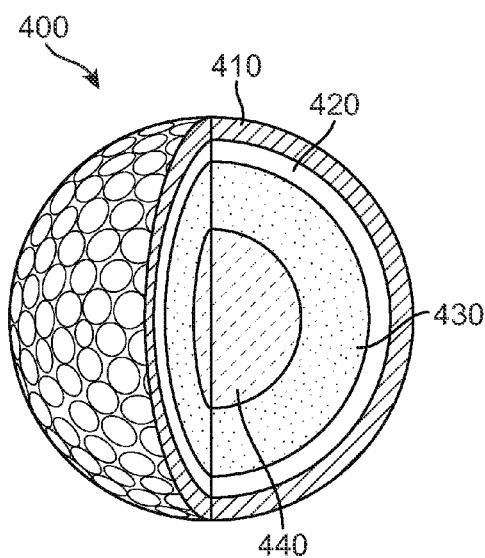
FIG. 4 is a schematic drawing of a four-piece golf ball.

Thus, the disclosure herein can be applied to any of the balls illustrated in FIGS. 1-4. For example, FIG. 1 shows a golf ball 100 having a two-piece construction comprising core 120 and cover layer 110. FIG. 2 shows a second golf ball 200 having a three-piece construction comprising core 230, mantle layer 220, and an outer cover layer 210. FIG. 3 shows a third golf ball 300 having a three-piece construction comprising inner core layer 330, an outer core layer 320, and outer cover layer 310. FIG. 4 shows a fourth golf ball 400 having inner core layer 440, outer core layer 430, mantle layer 420, and outer cover layer 410. Typically, each layer essentially encompasses interior layers.

The disclosure thus encompasses these golf balls, and golf balls having 5 or more layers or pieces. However, for convenience herein, the disclosure will be directed to the four embodiments shown in FIGS. 2-4, though it is anticipated that the lattice reinforced layer may be any layer from the innermost or center core to and including the cover.

Figure 5:
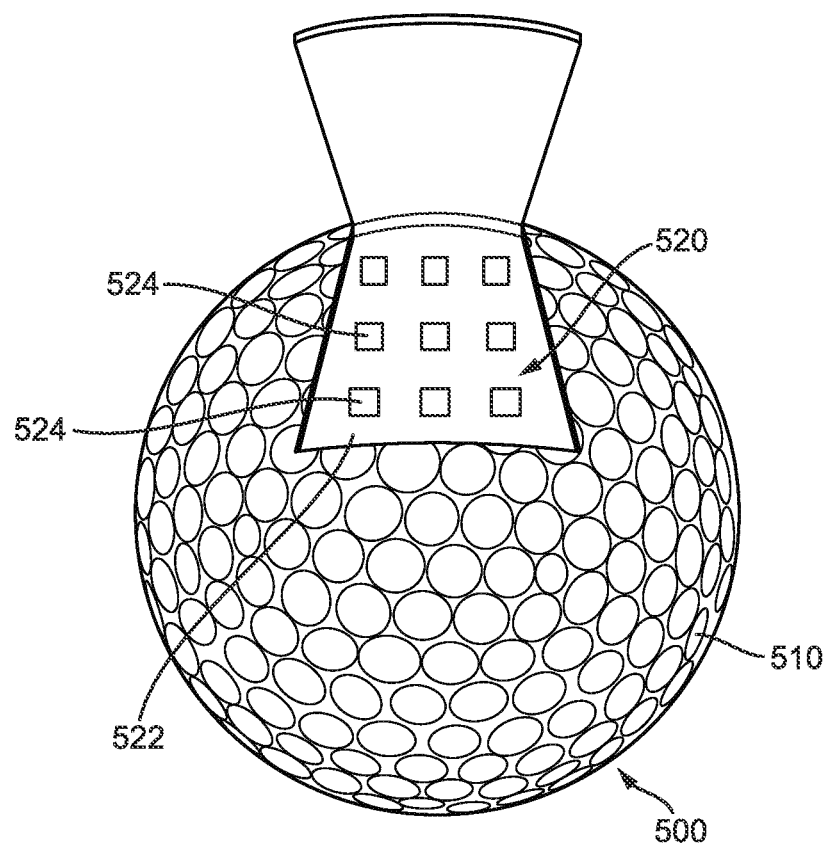
FIG. 5 is an isometric drawing of a golf ball, with the cover partially peeled away to reveal a lattice layer.

FIG. 5 shows a golf ball 500 including a lattice layer 520. In this embodiment, lattice layer 520 is positioned adjacent a cover layer 510. Cover layer 510 may be any type of cover layer known in the art, such as an ionomer, urethane, or rubber layer with dimples provided for aerodynamic effects.

Lattice layer 520 is generally formed from two materials interlocked or interdigitated with each other. A first material forms a first lattice portion 522, while a second material forms a second lattice portion 524. The materials are different, so it is intended that first lattice portion 522 and second lattice portion 524 have different properties and characteristics. For example, a monolithic layer formed from a single material has a single response to impacts, deformation, and compressive forces, such as are typically experienced by a golf ball when struck by a golf club. However, in a layer such as lattice layer 520, the response profile is more complex, as the different materials have different responses to the same imparted force. This complex response profile gives a golf ball designer a greater ability to fine tune the performance of a golf ball than when the golf ball designer is using a single material to make a monolithic layer.

For example, the first material of first lattice portion 522 may have a first strength, such as yield strength, failure strength, and tensile strength, a first hardness, a first compression, and a first toughness. The second material of second lattice portion 524 may have a second strength, such as yield strength, failure strength, and tensile strength, a second hardness, a second compression, and a second toughness. One or more of these and other characteristics can vary by only a small amount between the first material of first lattice portion 522 and the second material of second lattice portion 524 or one or more of these and other characteristics can vary by a large amount between the first material and the second material.

For example, the hardness may vary between the first material of first lattice portion 522 and the second material of second lattice portion 524. In an example where lattice layer 520 is a mantle layer, such as mantle layer 220 of FIG. 2 or mantle layer 420 of FIG. 4, the first material may have a relatively high hardness, for example, greater than 65 Shore D. A high hardness mantle may be beneficial if the cover layer is relatively soft, so that driver distance and spin are optimized. However, a high hardness mantle may have too hard a feel for some golfers. Therefore, the second material may have a lower hardness, for example, less than 60, to give the golf ball a softer feel. In some embodiments, the second material of second lattice portion 524 may be an ionomer with a Shore D hardness of 55 and the first material of first lattice portion 520 may have a Shore D hardness of 65. This relationship may be reversed (i.e., first lattice portion 520 may have a Shore D hardness of 55 and second lattice portion 524 may have a Shore D hardness of 65), depending on the desired feel and/or the type of player using the golf ball. Some examples of combinations of materials, where one material is used in first lattice portion 520 and the other material is used in second lattice portion 524, include terpolymer ionomer as the softer material and copolymer ionomer as the harder material; polyamide copolymer ionomer blend as the harder material and polyamide elastomer terpolymer ionomer blend as the softer material. In general, polyamide ionomer blends of different hardnesses may be used in the lattice layer. Other benefits of varying hardness in the cover layer can be found in US Patent Publication Number 2011/0177884, the disclosure of which is incorporated herein by reference.

The configuration of the lattice may also affect the response to impact. As shown, first lattice portion 522 forms a grid or net-like structure which contains openings, holes, or pores. Though shown as a regular grid with evenly spaced openings, first lattice portion 522 may have any configuration, such as irregularly-spaced openings, randomly-spaced openings, or the like. If first lattice portion 522 were a monolithic material, first lattice portion 522 could be relatively stiff. However, forming the openings in first lattice portion 522 lowers the stiffness of first lattice portion 522 over a monolithic layer of the same thickness. If second material of second lattice portion 524 is a material with a lower stiffness than that of first material, then the overall stiffness of the layer. This lower stiffness may also soften the feel of the ball for some golfers.

Figure 6:
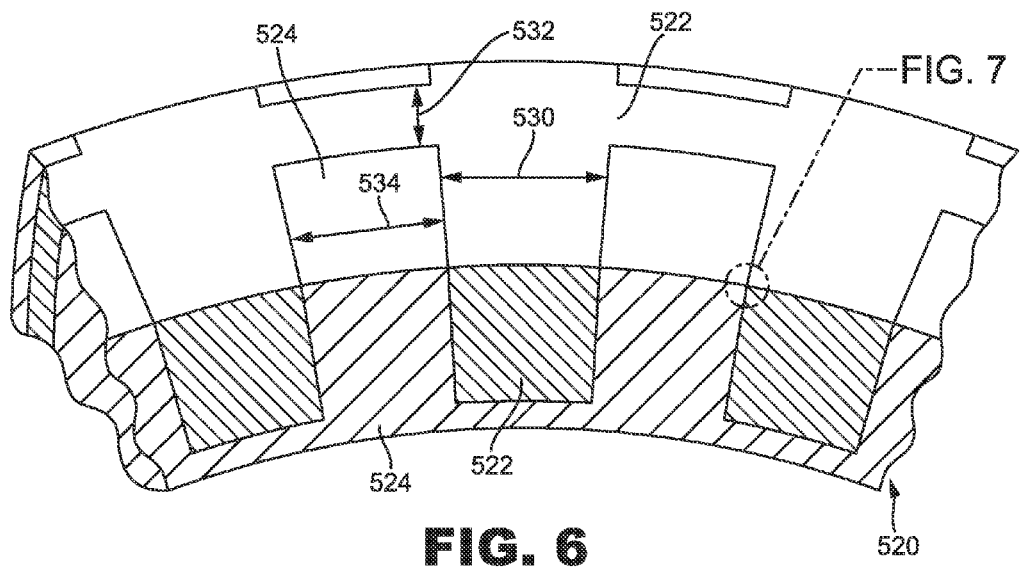
FIG. 6 is an enlarged, partial, cross-sectional view of a lattice layer.

FIG. 6 shows a portion of lattice layer 520 to show one embodiment of the lattice structure. First lattice portion 522 defines the openings filled by second lattice portion 524. In this embodiment, the openings are generally square in cross-sectional shape. The width 534 of a square cross-sectional shaped second lattice portion 524 within the opening may be any width desired, ranging from a relatively small percentage of the surface area of lattice layer 520 to roughly half of the surface area of lattice layer 520 or greater. In some embodiments, for example, width 534 may range from 0.5 mm to 10 mm. In other embodiments, width 534 may be larger or smaller than this range.

The distance between two adjacent openings is defined by first distance 530 and second distance 532. First distance 530 and second distance may be substantially the same, to provide a fairly regular grid, or may vary. In some embodiments, first distance 530 and/or second distance 532 may vary along the length or width of a single opening, such as when the opening itself does not have a regular polygonal shape, for example, then the opening is generally circular or oval.

In some embodiments, as shown most clearly in FIG. 6, lattice layer 520 is constructed to have a continuous, smooth interdigitated surface 527 formed from the interlocked members of first lattice portion 522 and second lattice portion 524, and a second surface 523 formed entirely of the second material of second lattice portion 524. Smooth interdigitated surface 527, where neither lattice portion extends beyond the other, allows neither lattice portion to dominate the response on impact. This smooth surface can be achieved using a shutoff molding technique described below. This configuration is shown in greater detail in FIG. 7.

Figure 7:
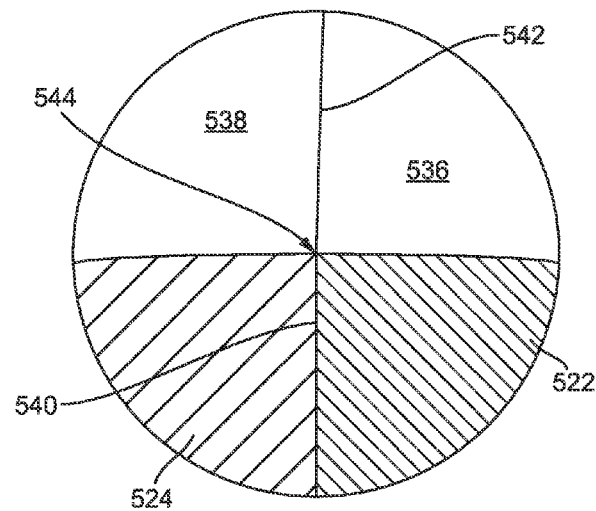
FIG. 7 is a close-up view of a portion of FIG. 6.

FIG. 7 shows the interface of first lattice portion 522 and second lattice portion 524. As can be clearly seen, the top interface 542 between first lattice portion 522 and second lattice portion 524 shows that first lattice portion top surface 536 is coextensive with second lattice portion top surface 538. FIG. 7 also shows the side interface between first lattice portion 522 and second lattice portion 524.

Second surface 523 includes only a portion of second lattice portion 524. As shown in FIG. 6, bottom surface of first lattice portion 522 does not extend all the way to second surface 523. However, this homogeneous surface may also provide a surface that is more readily compatible or made compatible with the material of an adjacent layer.

Figure 8:
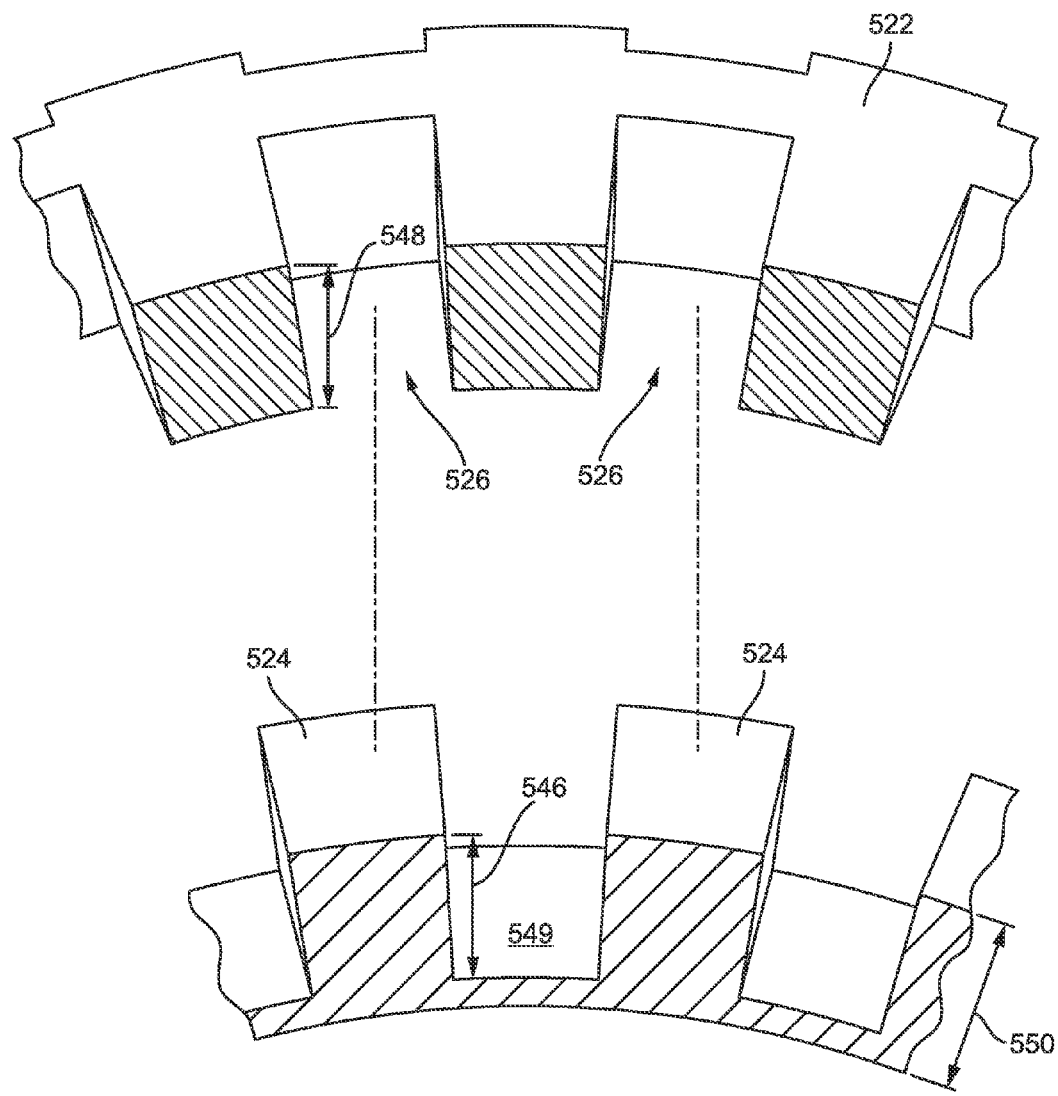
FIG. 8 is an exploded view of the portion of the lattice layer shown in FIG. 6.

FIG. 8 is an exploded view of a portion of lattice layer 522 shows the interdigitation of first lattice portion 522 and second lattice portion 524. First lattice portion 522 defines openings or pores 526 configured to receive extensions of second lattice portion 524. Pores 526 have a first height 548, which in some embodiments, is the same height as first lattice portion 522. These extensions project away from an upper surface 549 of second lattice portion 524 to a height shown by second height 546. In some embodiments, such as those shown in the embodiments in the figures, first height 548 and second height 546 are the same. In other embodiments, first height 548 and second height 546 may be the same or different. Because in some embodiments second lattice portion 524 forms the entirety of lower surface of lattice layer 522, a second lattice portion height 550 may be greater than second height 546.

As shown by the dotted lines in FIG. 8, the extensions of second lattice portion 524 are shaped and sized to be fitted within pores 526 of first lattice portion 522. In some embodiments, the lattice portions may be formed separately so that second lattice portion 524 is actually pressed or press-fitted into pores 526. In other manufacturing embodiments, such as those described below, these layers are injection molded in the same mold, where second lattice portion 524 is molded into first lattice portion 522. Therefore, while discussed herein for the sake of conceptualization as second lattice portion 524 as being fitted within first lattice portion 522, the lattice portions may be considered to be interdigitated or interlocked without regard to which portion may be pressed into another portion or whether the portions are co-molded so that neither portion is actually physically pressed into the other.

While lattice layer 520 may be made of any material, such as a thermoplastic material or a thermoset material, because of a particularly suitable manufacturing technique that employs shutoff injection molding, thermoplastic materials may be especially well suited for lattice layer 520. Suitable materials include an ionomer resin, a highly neutralized polymer composition, a polyamide resin, a polyester resin, and a polyurethane resin. In some embodiments, the materials are foamed or are cellular in structure. Mixtures and alloys of these materials are also suitable, with additives and fillers included in the recipe to manipulate the properties of the materials, from hardness and specific gravity to melt flow.

Suitable additives and fillers may include, for example, blowing and foaming agents, optical brighteners, coloring agents, fluorescent agents, whitening agents, UV absorbers, light stabilizers, defoaming agents, processing aids, mica, talc, nanofillers, antioxidants, stabilizers, softening agents, fragrance components, plasticizers, impact modifiers, acid copolymer wax, surfactants. Suitable fillers may also include inorganic fillers, such as zinc oxide, titanium dioxide, tin oxide, calcium oxide, magnesium oxide, barium sulfate, zinc sulfate, calcium carbonate, zinc carbonate, barium carbonate, mica, talc, clay, silica, lead silicate. Suitable fillers may also include high specific gravity metal powder fillers, such as tungsten powder and molybdenum powder. Suitable melt flow modifiers may include, for example, fatty acids and salts thereof, polyamides, polyesters, polyacrylates, polyurethanes, polyethers, polyureas, polyhydric alcohols, and combinations thereof.

Lattice layer 520 is, in some embodiments, made using injection molding techniques. For example, a mold configured with a cavity shaped like the desired golf ball layer may be provided and melt injected into the cavity via gates, which are very well known techniques. The precise methods, such as the melt temperature and duration of injection may vary depending on the thermoplastic material involved. For example, in embodiments where highly neutralized polymers are used for making lattice layer 520, during the injection molding process, the temperature of the injection machine may be set within a range of about 190° C. to about 220° C. For other melt materials, the temperature may be within or outside of this range.

FIGS. 9-12 show one embodiment of an injection molding process that forms the grid of the lattice layer, such as lattice layer 520, using a technique known as shutoff molding. Shutoff molding generally uses moving or members to form holes in a molded piece. This is accomplished by closing the mold to move the members into a position to form a mold surface for an initial injection, then retracting the member as the mold opens to leave a void in the molded piece. In some embodiments, these members can telescope.

Figure 9:
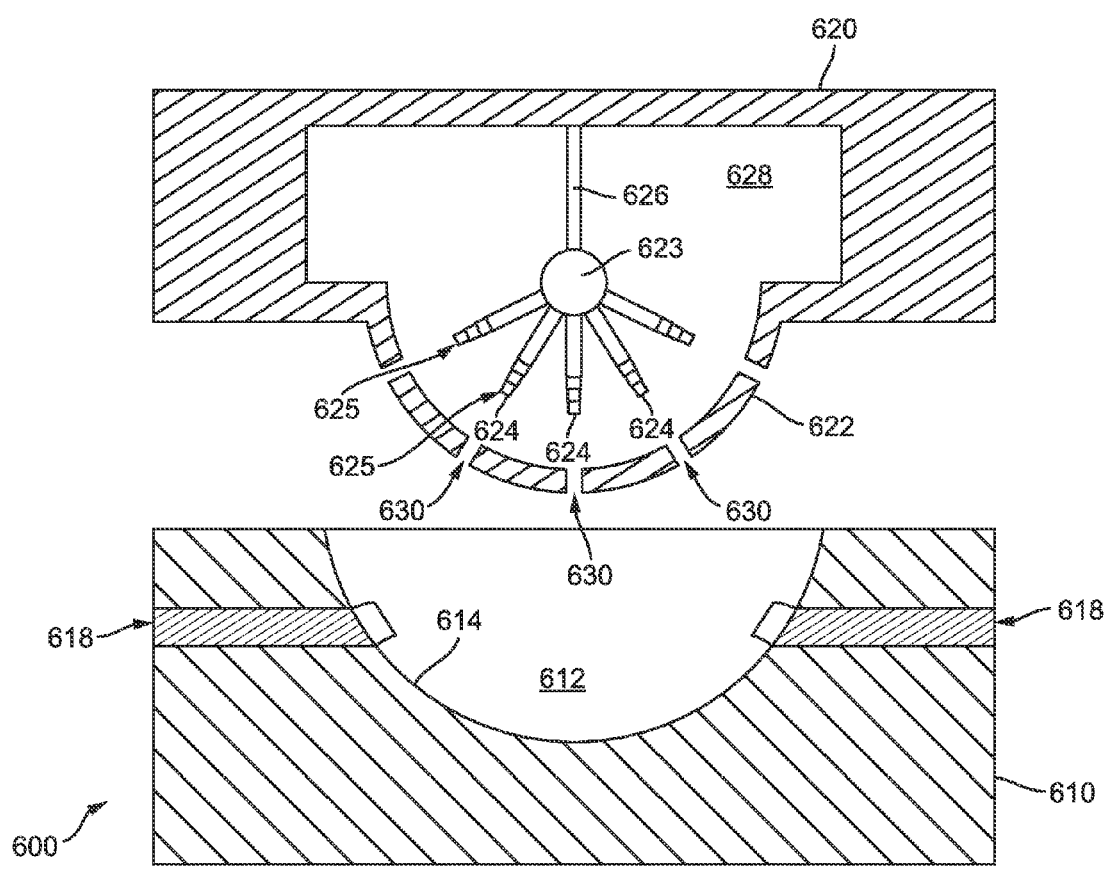
FIG. 9 is a schematic drawing of a mold configured to make a hemispherical lattice layer using a shutoff molding technique, showing telescoping members in a retracted position and the mold open.

FIG. 9 shows a mold 600 configured to form a hemispherical cup-shaped lattice layer using telescoping members. Mold 600 includes a first mold portion 610 and a second mold portion 620. First mold portion 610 includes a hemispherical cavity 612 having a smooth mold surface 614. If used to make a cover, mold surface 614 would not be smooth, but would include inverted dimples. Injection gates 618 are provided for the introduction of melt into cavity 612. Any number of gates 618 may be provided, even though only two are shown. A typical golf ball mold includes six (6) to twelve (12) gates.

Second mold portion 620 includes a hemispherical second mold surface 622. Second mold surface 622 defines openings 630 which are configured to be the desired size and shape of the openings in the lattice layer, such as pores 526 of lattice layer 520.

Second mold portion 620 also includes at least one telescoping member 625 positioned within an interior chamber 628. The same number of telescoping members 625 as desired openings in the lattice layer are provided. Telescoping members 625 are connected to an actuator 623, which is configured to extend and retract telescoping member 625. This may be accomplished using any method known in the art, such as pneumatic methods, hydraulic methods, and servo motors. Actuator 623 is mounted within interior chamber 628 using any type of mount 626 known in the art. Actuator 623 may be controlled by the same controller (not shown) controlling the injection sequence.

Second mold surface includes a second mold surface 622 that defines the inner curved surface of the hemispherical cup. Second mold surface 622 includes mold surface openings 630. Mold surface openings 630 are configured to accommodate the extension of telescoping members 625 into cavity 612.

Figure 10:
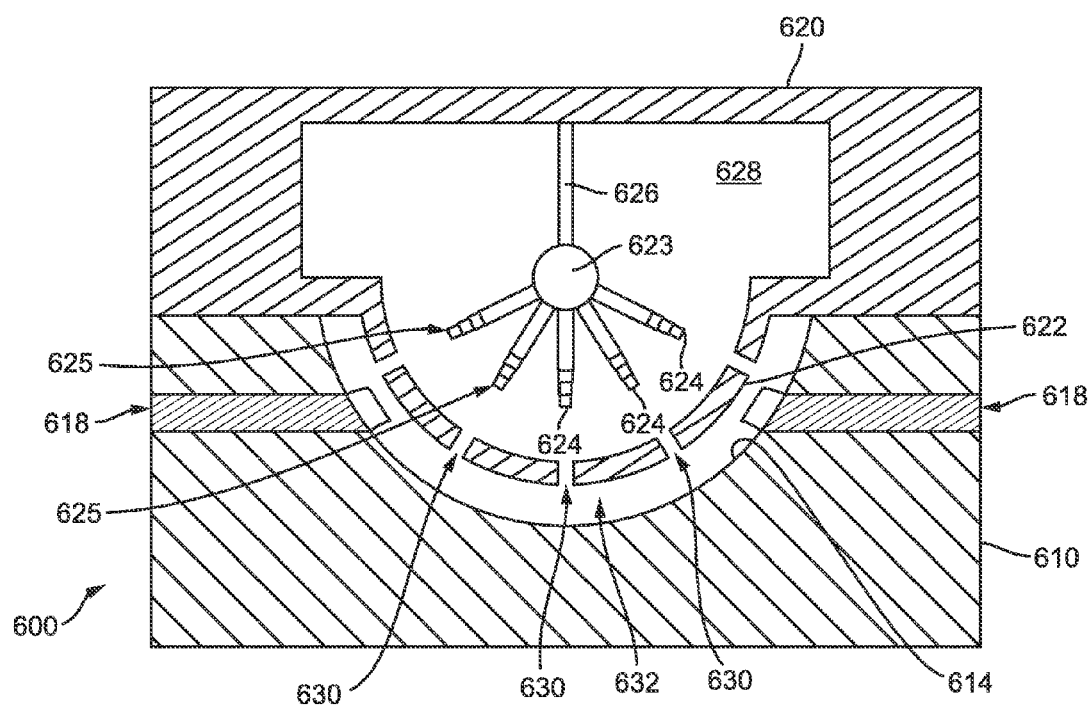
FIG. 10 is a schematic drawing of the mold shown in FIG. 9, showing the telescoping members in a retracted position and the mold closed.

FIG. 10 shows mold 600 in a closed position. Telescoping members 625 are in the retracted position, where the tips 624 of telescoping member 625 are positioned within interior chamber 628.

Figure 11:
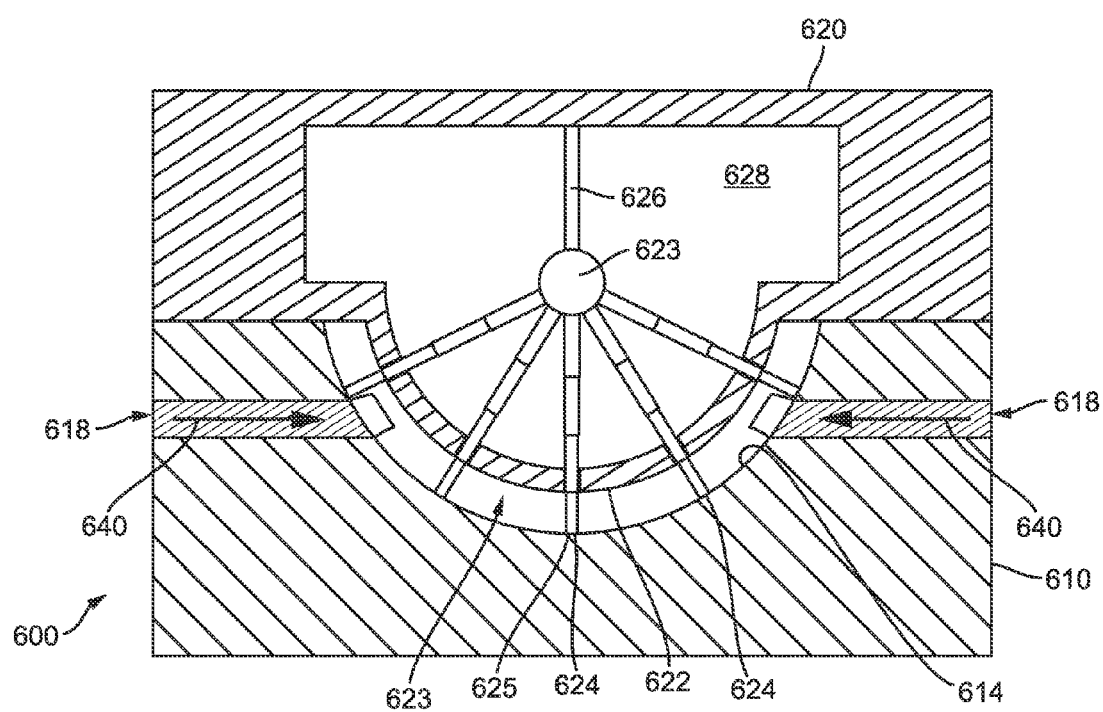
FIG. 11 is a schematic drawing of the mold shown in FIG. 9, showing the telescoping members in an extended position and the mold closed.

FIG. 11 shows mold 600 with telescoping members 625 fully extended so that tips 624 are in contact with first mold surface 614. Thus, telescoping member 625 form an additional set of mold surfaces to form holes in the resultant part.

To form the second lattice part, telescoping members 625 are retracted to the position shown in FIG. 10. Melt is introduced into the mold to fill the holes in the part formed during the injection as shown in FIG. 11. The harder material is often injection molded first in standard shutoff molding systems, while the softer or higher flow rate material is molded into and/or around the first material. Gates 618 may be used if gates 618 are aligned with the holes in the part. Alternatively, and not shown, additional gates may be provided in first mold portion 620 so that melt flows through channels provided through interior chamber so that melt flows into the hold through openings 630.

In sequence, the molding steps of this embodiment are generally providing a mold having a cavity, a mold surface, and telescoping members; positioning the telescoping members in an extended position, so that the telescoping members are in contact with the mold surface; injecting a first material into the cavity; ceasing injecting the first material into the cavity; moving the telescoping members to a retracted position; and injecting a second material into the cavity to produce a lattice portion.

In other embodiments, the whichever portion of the lattice structure is made from a harder or lower flow rate material, either the grid or the material that fills the grid pores, may be molded separately using any technique known in the art, such as injection molding, cutting, compression molding, or combinations of these methods. These hard elements may be pressed to the mold surface of a mold cavity, similar to how telescoping member 625 are pressed to the mold surface. The second material, which is softer or has a high flow rate is then injected to surround the hard material, thereby forming the lattice layer.

Figure 12:
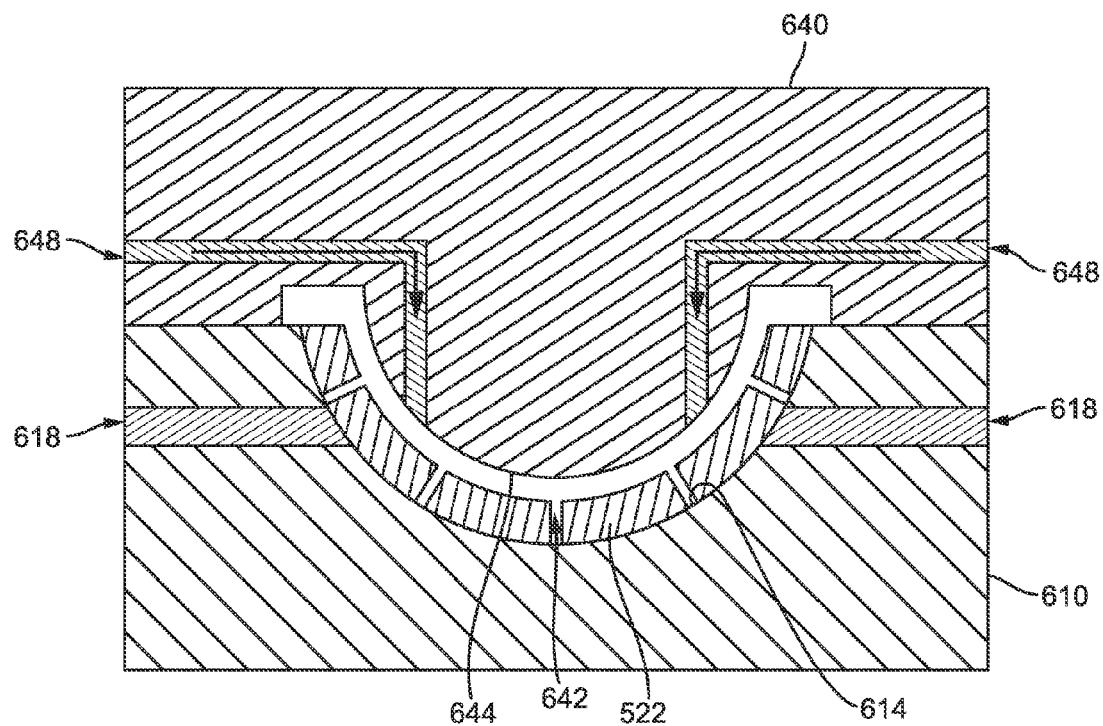
FIG. 12 is a schematic drawing of the mold shown in FIG. 9, with one half of the mold replaced with a mold containing no telescoping portions, and the mold is in a closed position.

In some embodiments, telescoping members 625 may instead be fixed members, but are otherwise similarly configured as telescoping members in that the fixed members are sized and shaped to form the openings in the lattice layer and extend to surface 614. However, to form the second portion of the lattice layer, i.e., to fill in the holes formed by the first shutoff molding process, a second mold portion 620 is removed after the injection to form the first portion of lattice layer and a third mold portion replaces second mold portion. FIG. 12 shows a third mold portion 640 to replace second mold portion 620. Third mold portion 640 includes a third mold surface 644 that defines the second surface of the lattice layer, such as second surface 523 of lattice layer 520. Third mold portion 640 includes additional gates 648 for injecting melt into the mold.

As shown in FIG. 12, when closed, third mold portion 640 creates a second mold gap 642 to accommodate the formation of the second lattice portion, such as second lattice portion 524. Second mold gap 642 includes both the extensions and the base of the second lattice portion. Melt is introduced into second mold gap 642 through gates 648. When the melt fills second mold gap 642, the melt is shut off and the mold is opened. The lattice layer hemispherical cup is then removed from the mold.

In sequence, the method of this embodiment is generally providing a mold having a cavity, a mold surface, and extended members; positioning the extended members in contact with the mold surface; injecting a first material into the cavity; ceasing injecting the first material into the cavity; removing extended members; providing a mold portion with a second mold surface; and injecting a second material into the cavity to produce a lattice portion.

After forming the hemispherical cups as shown in FIGS. 9-12, two hemispherical cups are joined together to form a completed lattice layer. If interior layers are provided, such as a core, the two cups are assembled around those layers and then joined. If exterior layers are provided, such as a cover layer, the two cups are joined and then the exterior layers are molded onto the completed lattice layer. The cups may be joined using any method known in the art, such as with adhesives, welding, compression molding, or the like.

In some embodiments, the first portion of the lattice layer, for example, the grid with pores or holes, is formed of a first material, such as by die cutting and compression molding, or by using injection molding with either the telescoping or fixed method shown above. A hemispherical cup may be formed. The hemispherical cup may then be applied to the outer surface of an inner layer, such as the smooth outer surface of a resin or rubber core. The holes or pores of the grid may then be filled in by overmolding a second material using known injection molding techniques. An example of such an embodiment is shown in FIGS. 13-19, which show a schematic embodiment of a method for making a golf ball with interlocking layers including a combination of compression and injection molding.

Figure 13:
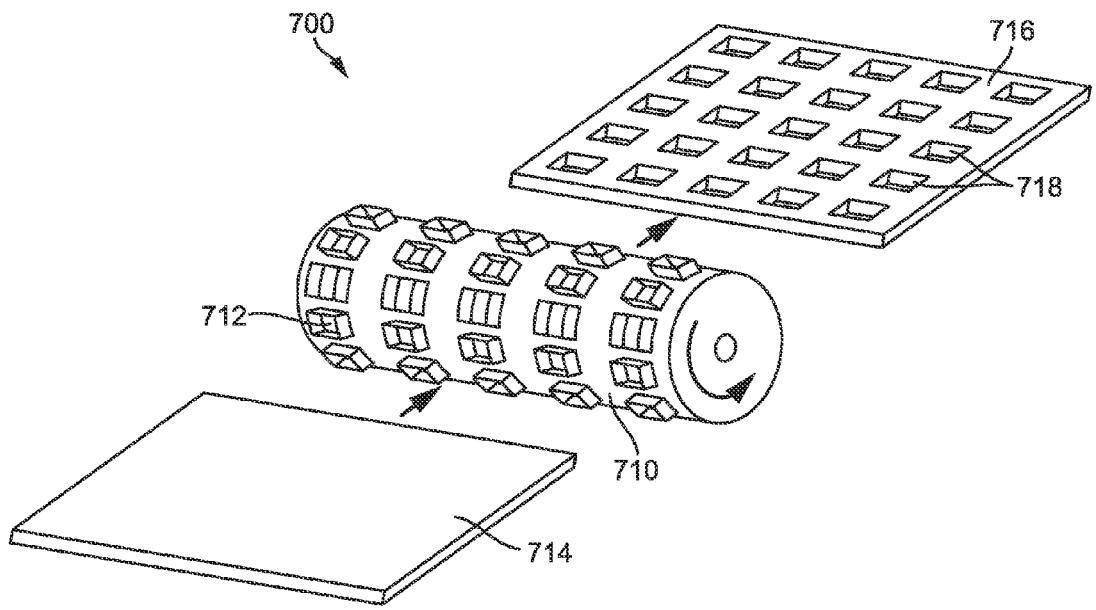
FIG. 13 is a schematic drawing of an alternate embodiment of a method of manufacturing a golf ball with a lattice layer, showing a die cutter and a portion of material being cut to form a grid.

FIG. 13 shows a schematic embodiment of a system 700 for forming a grid. A cutting tool 710 configured to cut an initial portion of material 714 into a grid 716 having at least one hole or pore 718. Grid 716 generally corresponds to first lattice portion 522 shown in FIGS. 5-8 and discussed above. Portion 714 may be made of any type of material typically used in golf balls that is suitable for forming the grid portion of a lattice layer, such as thermoset materials such as rubber or thermoplastic materials such as various polymers and ionomers. In some embodiments described herein, the material of portion 714 is anticipated to have a higher melt and glass transition point than the material used to fill pores 718, which material is discussed below.

The dimensions of portion 714 may be any dimensions suitable for manufacturing and/or inclusion in a lattice layer. For example, the length and width of portion 714 may be any length or width suitable for facilitating manufacturing, such as a continuous roll of material. The length and width of portion 714 may be cut down for subsequent molding steps. However, the thickness of portion 714 in most embodiments will be selected to be about the thickness of the resultant lattice layer.

In the embodiment shown in FIG. 13, cutting tool 710 is a die cut roller having multiple cutting blades 712 configured into any desired pattern. In the embodiment shown in FIG. 13, this pattern is one of repeating squares. In other embodiments, the pattern may be different, but in most embodiments will be a repeating pattern to form an even grid. In other embodiments, cutting tool 710 may be any type of cutter capable of cutting a pattern in a portion of material, such as a laser cutting tool, an individual die cutter, a CNC machine with any of a variety of cutting heads, or other machines or tools which may be apparent to those of skill in the art.

Cutting tool 710 may be arranged on a table, so that a technician or factory worker positions portion 714 proximate cutting tool 710, or a conveyor system, which may move portion 714 towards cutting tool 710 in a more automated fashion. As indicated in FIG. 13, when a die cutting roller is used, the roller rotates in the direction of the arrow to advance portion 714 in a manufacturing direction. As portion 714 moves underneath or proximate cutting tool 710, blades 712 remove sections of material from portion 714 so that grid 716 with pores 718 is formed.

Figure 14:
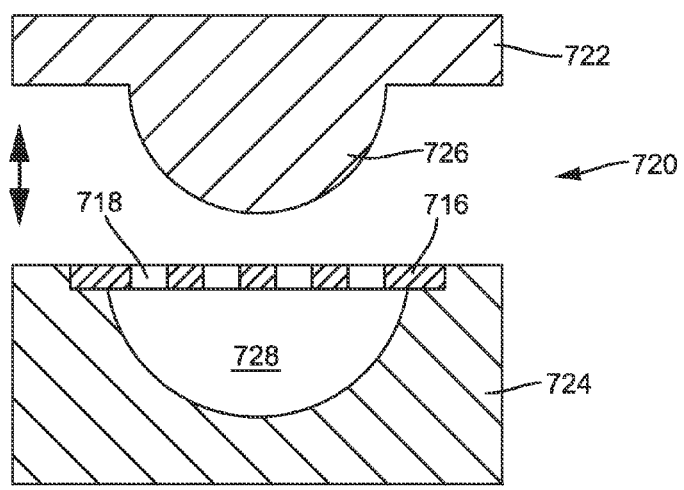
FIG. 14 is a schematic drawing of a mold configured to mold the grid shown in FIG. 13 into a substantially hemispherical cup, with the grid inserted in position and the mold open.
Figure 15:
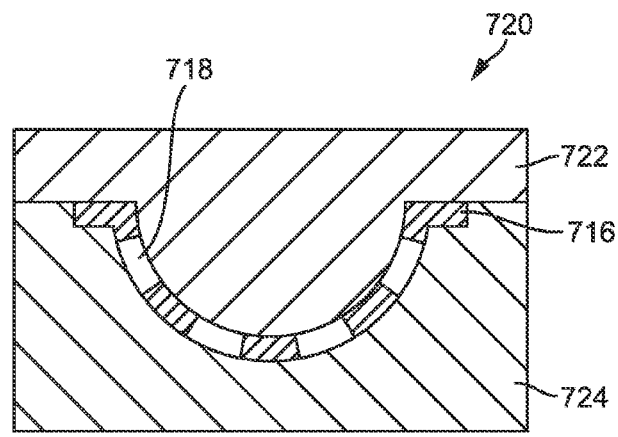
FIG. 15 shows the mold of FIG. 14 in a closed position, with the grid conformed to the mold surfaces of the mold.

Once grid 716 is formed, grid 716 may be sized, such as by cutting, to fit into a first mold 720, shown in FIG. 14. First mold 720 is configured to compression mold grid 716 into a hemispherical cup or substantially hemispherical cup. First mold 720 includes a first upper mold portion 722 and a first lower mold portion 724. First upper mold portion 722 includes a protrusion 726 which provides a first mold surface. First lower mold portion 724 includes a cavity 728 which provides a second mold surface. The shape of protrusion 726 and cavity 728 are complementary so that they fit together when first mold 720 is closed. First upper mold portion 722 and first lower mold portion 724 are configured to move together and move away from each other, using techniques well known in the art, so that protrusion 726 is inserted into cavity 728 while trapping grid 716 between the two molding surfaces, as shown in FIG. 15. First mold 720 may apply both heat and pressure to conform grid 716 to the shape defined by protrusion 726 and cavity 728, in this embodiment, into hemispherical cups, such as first cup 730 and second cup 731 shown in FIG. 16.

As shown in FIG. 15, pores 718 become distorted within first mold 720 due to the compression molding process. It is possible to account for this distortion using known techniques, such as those used in texture mapping or shrink wrap technologies, such as those described in U.S. Pat. No. 7,881,818, which is incorporated herein by reference. In some embodiments, such as those in which a regular grid is desired for hemispherical cups 731, blades 712 of cutting tool 710 will be positioned in a non-regular pattern that will distort in first mold 720 to the desired regular pattern. In other embodiments, where the distortion is desirable or minimal, no accounting for the distortion may be provided.

Figure 16:
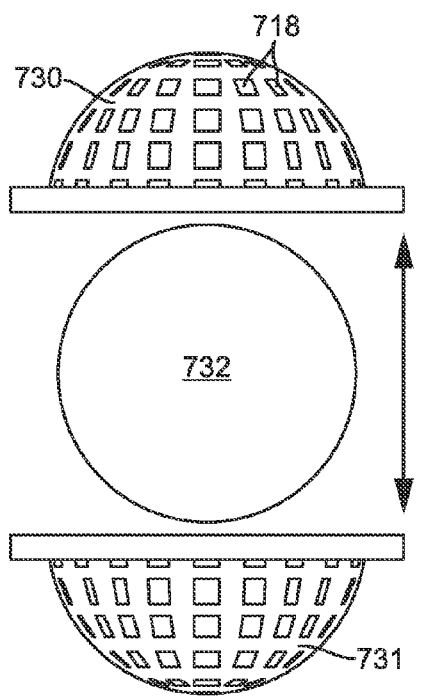
FIG. 16 shows the hemispherical cups positioned to receive a previously-molded component of the golf ball, prior to being joined together to form a grid component.
Figure 17:
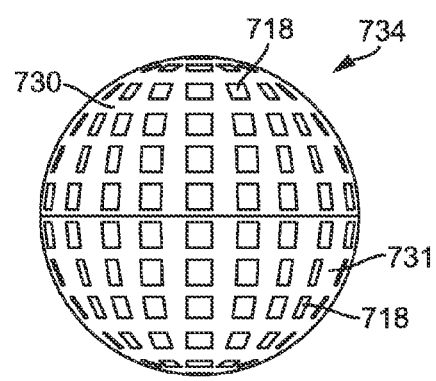
FIG. 17 shows the grid component in a completed configuration, with the hemispherical cups joined together and trimmed at the seamline.

FIGS. 16 and 17 show the next step in the making of a golf ball with the assembly of two hemispherical cups, first cup 730 and second cup 731 and one interior golf ball component 732 into a gridded component 734. Interior golf ball component 732 may be any interior golf ball layer or combination of interior golf ball layers, such as inner cores, outer cores, single layer cores, cores and at least one intermediate layer such as a mantle, and other combinations as will be readily apparent to those in the art.

Interior golf ball component 732 is positioned between first cup 730 and second cup 731. Both first cup 730 and second cup 731 may be provided with a lip to facilitate joining first cup 730 to second cup 731. First cup 730 and second cup 731 may be joined using any technique known in the art, such as by a second compression welding step, adhesives, spin welding, and combinations of these techniques. Joining first cup 730 and second cup 731 seals interior golf ball component 732 inside the cups. In most embodiments, interior component 732 is sized to fit snugly within the cups, such as touching all interior surfaces of the cups. In some embodiments, adhesive, such as known adhesive films may be provided between interior component 732 and the grid to ensure that interior component 732 is inhibited from moving within the cups during play of the golf ball. In other embodiments, the joining method used to join first cup 730 to second cup 731 adheres interior component 732 to the cups, such as by melting or bonding the material of the cups to the material of interior component 732.

FIG. 17 shows an assembled gridded component 734, where the gridded hemispherical cups are joined into a gridded sphere that contains interior component 732. Gridded component 734 has empty pores 718.

Figure 18:
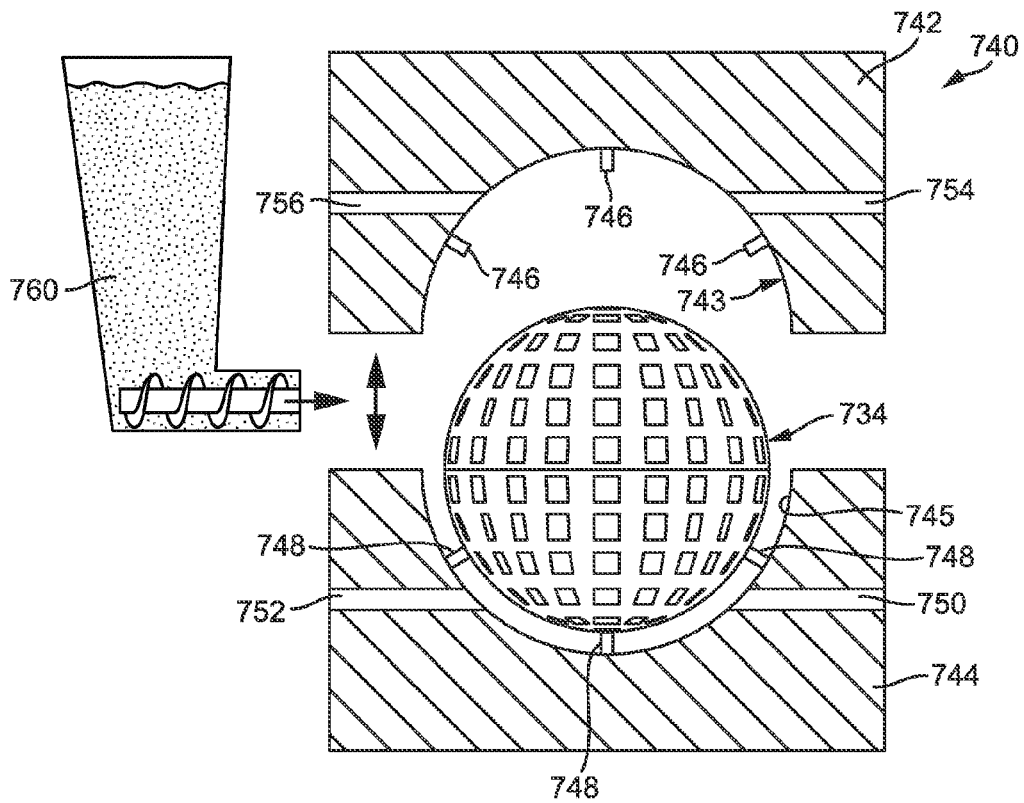
FIG. 18 shows the grid component positioned in a mold configured to receive material via an injection molding process.
Figure 19:
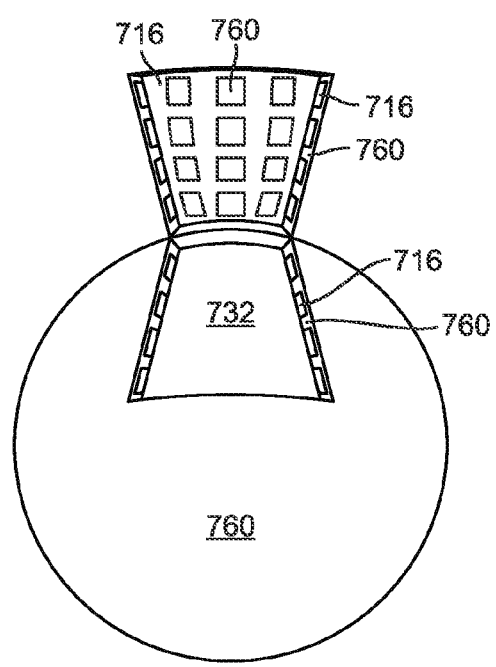
FIG. 19 shows a completed golf ball, with a portion of the golf ball lifted away to show the lattice layer.

To form the lattice layer, a second molding process is performed to fill pores 718 with a second material. In most embodiments, the second molding process is an injection molding process, one embodiment of which is schematically shown in FIG. 18. In other embodiments, other molding or filling processes may be used, such as compression molding, dipping, or the like.

In the embodiment shown in FIG. 18, a second mold 740 is provided. Second mold 740 includes second upper mold half 742 and second lower mold half 744, which are configured to move toward and away from each other, as is well known in the art. Second upper mold half 742 includes a first injection cavity, which is defined by a first injection molding surface 743. Second lower mold half 744 includes a second injection cavity which is defined by a second injection molding surface 745. Second upper mold half 742 includes at least one retractable pin 746 configured to hold gridded component 734 away from first molding surface 743 to create a gap between first molding surface 743 and gridded component 734. Similarly, second lower mold half 744 includes at least one retractable pin 748 configured to hold gridded component 734 away from second molding surface 745 to create a gap between second molding surface 745 and gridded component 734. While three retractable pins are shown in each mold half in FIG. 18, any number of pins may be provided as desired for the process. The use of retractable pins, such as the control and timing of retraction, are well known in the art.

To accommodate the introduction of melt into the mold, second upper mold half 742 includes a first injection molding gate 754 and a second injection molding gate 756. Similarly, second lower mold half 744 includes a third injection molding gate 750 and a fourth injection molding gate 752. While four injection molding gates are provided in mold 740, any number of gates may be provided. In many golf ball injection molds, between six (6) and twelve (12) gates are provided. The gates are configured to receive a second molten material from an injection molding system 760, which may be extruded with screws through a nozzle in fluid communication with the gates of second mold 740.

As the molten material or melt flows into second mold 740, the melt fills pores 718 (shown in FIG. 17) and the space between gridded component 734 and first mold surface 743 and second mold surface to form an outer layer 760. Outer layer 760 forms the second lattice portion of the lattice layer by filling pores 718 and forms a smooth outer surface of the lattice layer component, shown in FIG. 19. Outer layer 760 is peeled away to show interior component 732, grid 716, and how outer layer 760 is interdigitated with grid 716. If formed as a cover, such as of a durable cover material and with dimples, the component shown in FIG. 19 may be a completed golf ball. In other embodiments, a cover layer and/or one or more additional layers may subsequently be molded onto the component shown in FIG. 19 to form the complete golf ball.

The material for outer layer 760 may be any material known in the art that is suitable for injection molding, such as thermoplastic materials and certain thermoset materials capable of being injected by processes such as RIM molding. In some embodiments, the material for outer layer 760 has a lower melt and glass transition temperature than the grid material so as not to deform or change the materials properties of the grid during the second molding process. In other embodiments, deformation or changing the materials properties of the grid will not be a concern.

While various embodiments of the invention have been described, the description is intended to be exemplary, rather than limiting and it will be apparent to those of ordinary skill in the art that many more embodiments and implementations are possible that are within the scope of the invention. Accordingly, the invention is not to be restricted except in light of the attached claims and their equivalents. Further, any element of any embodiment may be substituted into any other embodiment unless specifically restricted in the specification. Similarly, the sequence of any method described herein is not limited to the order in which that method is presented unless specifically restricted in the specification. Also, various modifications and changes may be made within the scope of the attached claims.

What is claimed is:

1. A golf ball comprising:
    a core formed from rubber;
    a cover positioned radially outward of the core; and
    a lattice layer positioned between the core and the cover;
    wherein the lattice layer comprises a first thermoplastic material having a Shore D hardness greater than 65 and a second thermoplastic material having a Shore D hardness less than 60, and
    wherein the lattice layer has an outer, interdigitated surface of the first material and the second material and an inner surface of only the second material, the second material filling openings in and extending through the first material.

2. The golf ball according to claim 1, wherein the openings in the first material are evenly spaced.

3. The golf ball according to claim 2, wherein at least one of the first material and the second material is foamed.

4. The golf ball according to claim 2, wherein the first material has a first tensile strength and the second material has a second tensile strength different from the first tensile strength.

5. The golf ball according to claim 2, wherein the first material has a first compression deformation, and
    wherein the second material has a second compression deformation, and wherein the first compression deformation is different from the second compression deformation.

6. A golf ball comprising a core surrounded by a lattice layer having a first, inner surface and a second, outer surface,
    wherein the lattice layer comprises a first material and a second material,
    wherein the first material and the second material are thermoplastic materials and are interlocked,
    wherein the first material has a Shore D hardness less than 60,
    wherein the second material has a Shore D hardness greater than 65,
    wherein the core is rubber, and
    wherein the first, inner surface consists of the first material and the second, outer surface consists of the first material and the second material.

7. The golf ball of claim 6, wherein the first material and the second material are interlocked by a grid of openings in the second material wherein the openings are filled by extensions of the first material.

8. The golf ball of claim 7, wherein the first material has greater strength than the second material in at least one of yield strength, failure strength, and tensile strength.

9. The golf ball of claim 7, wherein the first material has a greater tensile strength than the second material.

10. The golf ball of claim 6 further comprising a core layer, wherein the lattice reinforced layer is positioned radially outward of the core layer.

11. The golf ball of claim 6, further comprising a cover layer, wherein the cover layer surrounds and encompasses the lattice reinforced layer.

12. The golf ball of claim 6, wherein the cover layer comprises a portion of the lattice reinforced layer.

13. The golf ball of claim 6, wherein at least one of the first material and the second material is foamed.

14. The golf ball of claim 6, wherein the first material has a Shore D hardness of 55.

15. The golf ball according to claim 1, wherein the second thermoplastic material has a Shore D hardness of 55.

* * * * *